A. J. BORLAND.
ROTARY-CHURN.
No. 191,562.　　　　　　　　　　　Patented June 5, 1877.
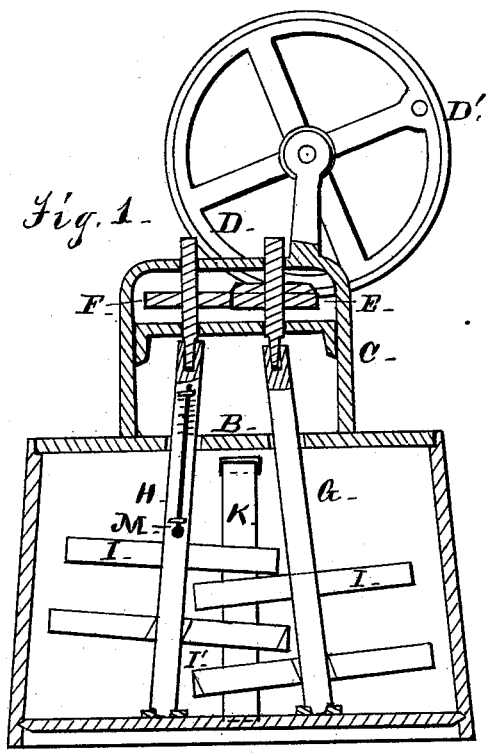
Fig. 1.
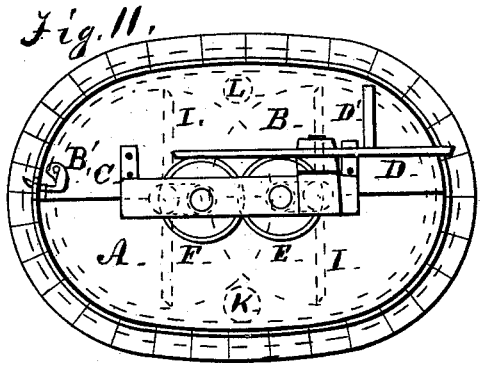
Fig. II.
Witnesses:
F. M. Tate
Wm. J. Cochran
Inventor:
Andrew J. Borland,
By Saml. J. Wallace,
Attorney.
N. PETERS, PHOTO-LITHOGRAPHER, WASHINGTON, D. C.

UNITED STATES PATENT OFFICE.

ANDREW J. BORLAND, OF DONNELLSON, IOWA.

IMPROVEMENT IN ROTARY CHURNS.

Specification forming part of Letters Patent No. 191,562, dated June 5, 1877; application filed March 28, 1877.

*To all whom it may concern:*

Be it known that I, ANDREW J. BORLAND, of Donnellson, Lee county, Iowa, have invented a new and useful Improvement in Churns. This is made substantially as set forth hereinafter, referring to the accompanying drawings, in which—

Figure 1 is a vertical section of the improved churn. Fig. 2 is a plan of the same.

This invention consists in an improved churn, having a crank driving-handle and the several features of improvement set forth hereinafter.

The churn is built of staves or otherwise. The lid is made of two parts, A B. These rest on an offset in the top of the churn. The part A is loose, so as to be readily removed for opening the churn. The part B bears the operating apparatus. It has holding-locks B' at each end and at the side to secure it solidly to the churn. The lid B bears a frame, C, solidly attached. This bears three wheels, D E F, geared together. The drive-wheel D has teeth on one side, gearing into wheel E, and a crank, D', on the other side for turning it. The wheel E gears into wheel F, so as to turn it the reverse direction. The shafts of wheels E F have holding-bearings in the frame C above and below. The lower ends of these shafts project below and are made square in cross-section. The ends of dasher-shafts H G fit onto these by means of square sockets in them, so as to be turned, and so as to be readily removed from the churn without taking off the lid. These shafts G H rest by pins in bearings on the bottom of the churn. They have horizontal dasher-blades 1 arranged so those on one will be opposite the spaces on the other. The bottom blades on each are beveled at top and bottom, as shown at I', so that by turning one way they will tend to move the milk downward, the ends being also beveled to throw it to the center at the same time. The shafts stand inclined toward each other at the top to agree with the contraction of the top of the churn. The sockets in the ends of the shafts are arranged to allow this. The churn is made of a compressed cylindrical form to suit the spaces the blades traverse.

When the crank D' is turned the two dashers turn in opposite directions, each traversing part of the space of the other. They are set so that the blades pass each other and come into a common plane at one point. This action throws the milk each way, by the two sets of blades moving in opposite directions, and tends to keep it somewhat stationary, so the dashers can strike it efficiently. The churn is contracted toward the top to throw the milk downward and avoid splashing out.

When the churning is done the lid B is raised a little, and one shaft is removed. Then, by turning the other, the milk forms an eddy in the other end, so as to concentrate and rapidly gather the butter therein.

The thermometer M is set into the shaft H, with its bulb in the milk-space and its tube above the lid, to show the temperature outside.

The thin-walled chamber K is set into one side of the churn in the space left by the two dashers in turning. Water of suitable heat or coldness is put into this to properly regulate the temperature of the milk in churning. It is removed when not needed, and is cleaned separately from the churn. On the other side of the churn is a tube, L, set in the corresponding space. This reaches from the top to the bottom. This conducts hot or cold water to the bottom of the churn, when desired to mix thoroughly with the milk. The chamber K and tube L are made of glass. This is easily kept clean, and allows the heat to pass freely through, as well as is not acted on by acids, as metal might be. A seat is formed in the bottom of the churn for chamber K, to hold it in its place during the churning. This chamber assists in holding the milk from rotation with the dashers, so they can strike it efficiently.

The chamber K has seats sunk for it both in the bottom and the lid A B, so as to hold it securely in place; and a hole is provided in the lid, opening down into it, for the admission of water to modify the temperature. The tube L fits up through a hole in the lid, fitting closely to it, for pouring in the water, and holding the tube in place.

I claim—

1. The churn constructed with the two separate revolving dashers, as described, and with the water chamber or tube K in the milk-chamber next to the wall, substantially as set forth.

2. The churn having elliptical chamber and two upright revolving dashers within partly separate spaces, constructed with a horizontal hand-crank and gearing arranged to drive the two dasher-shafts in contrary directions, and with a water tube or chamber, substantially as and for the purpose set forth.

ANDREW J. BORLAND.

Witnesses:
SAML. J. WALLACE,
WM. J. COCHRAN.